United States Patent [19]
Salinas et al.

[11] Patent Number: 5,772,713
[45] Date of Patent: *Jun. 30, 1998

[54] ADJUSTABLE FILTER ASSEMBLY

[76] Inventors: Irma C. Salinas; Kenyon D. Potter, both of 1180 Eddy St., San Francisco, Calif. 94109

[ * ] Notice: This patent issued on a continued prosecution application filed under 37 CFR 1.53(d), and is subject to the twenty year patent term provisions of 35 U.S.C. 154(a)(2).

[21] Appl. No.: 655,601

[22] Filed: May 30, 1996

[51] Int. Cl.⁶ .......................... B01D 46/10; B01D 29/01
[52] U.S. Cl. ............................. 55/496; 55/510; 55/511; 55/DIG. 31; 210/476; 210/478; 210/480; 359/882
[58] Field of Search ................. 95/273; 55/496, 55/DIG. 31, 490, 501, 510, 511; 210/476, 478, 480; 359/882

[56] References Cited

U.S. PATENT DOCUMENTS

| | | | |
|---|---|---|---|
| Re. 35,236 | 5/1996 | Nolen, Jr. | 55/496 |
| 1,122,437 | 12/1914 | Sweeney | 55/496 |
| 1,325,961 | 12/1919 | Smith | 55/496 |
| 1,808,170 | 6/1931 | Kamrath | 98/2 |
| 2,175,903 | 10/1939 | Lichtman | 55/496 |
| 2,213,017 | 8/1940 | Perkins | 98/2 |
| 2,262,384 | 11/1941 | Cooper | 261/98 |
| 2,537,278 | 1/1951 | Patterson | 98/2 |
| 2,565,698 | 8/1951 | Patterson | 55/496 |
| 2,624,405 | 1/1953 | Lynch | 55/496 |
| 2,796,820 | 6/1957 | Moore et al. | 98/2 |
| 2,813,595 | 11/1957 | Fields | 183/7 |
| 2,991,843 | 7/1961 | Bell, Jr. | 55/496 |
| 3,274,759 | 9/1966 | Bell, Jr. | 55/496 |
| 3,509,697 | 5/1970 | Dewey et al. | 55/276 |
| 3,531,150 | 9/1970 | Jahnke | 296/1 |
| 3,583,754 | 6/1971 | von Berckhelm | 296/1 |
| 3,657,992 | 4/1972 | Minnick, Jr. | 98/2.11 |
| 3,675,402 | 7/1972 | Weed | 55/496 |
| 3,693,410 | 9/1972 | Robrecht et al. | 73/28 |
| 3,707,046 | 12/1972 | De Baun | 55/496 |
| 4,077,787 | 3/1978 | Akado et al. | 55/419 |
| 4,223,598 | 9/1980 | Suzuki et al. | 98/2.11 |
| 4,244,710 | 1/1981 | Burger | 55/6 |
| 4,365,541 | 12/1982 | Marques et al. | 98/2.11 |
| 4,376,408 | 3/1983 | Iijima et al. | 98/2.03 |
| 4,531,453 | 7/1985 | Warman et al. | 98/2.11 |
| 4,587,890 | 5/1986 | Hurlburt | 98/2.11 |
| 4,733,605 | 3/1988 | Holter et al. | 98/2.11 |
| 4,768,423 | 9/1988 | Boeger | 98/2.11 |
| 4,779,517 | 10/1988 | Weller et al. | 98/2.16 |
| 4,788,903 | 12/1988 | Johnson | 98/1.5 |
| 4,811,159 | 3/1989 | Foster, Jr. | 361/231 |
| 4,911,737 | 3/1990 | Yehl et al. | 55/2 |
| 4,989,500 | 2/1991 | Anliker et al. | 98/211 |
| 5,003,866 | 4/1991 | Ricci | 98/2.02 |
| 5,004,483 | 4/1991 | Eller et al. | 55/20 |
| 5,050,487 | 9/1991 | Arold et al. | 98/2.11 |

(List continued on next page.)

FOREIGN PATENT DOCUMENTS 2211110   6/1989   United Kingdom .................... 55/496

*Primary Examiner*—Duane S. Smith

[57] ABSTRACT

An adjustable filter assembly for a variety of filtration applications. The adjustable filter assembly includes a fixed-size filter medium and frame and an adjustable molding for adjustably applying said filter assembly in applications having widely varying dimensions. The filter assembly can take a variety of shapes and sizes so that any vent may be adequately fitted and filtered. The adjustability of the assembly is accomplished by the molding having at least one adjustable joint enabling the molding to be continuously adjusted from an unextended position through to a fully extended position. In the unextended position, the outside edge of the molding coincides with the perimeter of the filter media and the inner edge of the molding defines a minimum exposed area for the filter medium. In the fully extended position, the inner edge of the molding coincides with the perimeter of the filter media and the outside edge of the molding extends outwardly significantly beyond the perimeter of the filter media.

20 Claims, 5 Drawing Sheets

U.S. PATENT DOCUMENTS

| | | | |
|---|---|---|---|
| 5,059,224 | 10/1991 | Kikkaw et al. | 55/385.3 |
| 5,062,353 | 11/1991 | Arold et al. | 98/2.11 |
| 5,085,132 | 2/1992 | Ikeda et al. | 98/2.11 |
| 5,085,266 | 2/1992 | Arold et al. | 165/1 |
| 5,087,273 | 2/1992 | Ward | 55/279 |
| 5,119,718 | 6/1992 | Wagner et al. | 454/158 |
| 5,129,928 | 7/1992 | Chan et al. | 55/97 |
| 5,169,356 | 12/1992 | Arold | 454/139 |
| 5,188,646 | 2/1993 | Nolen, Jr. | 55/496 |
| 5,221,292 | 6/1993 | Aoyama | 55/270 |
| 5,230,800 | 7/1993 | Nelson | 210/496 |
| 5,254,033 | 10/1993 | Brauen et al. | 454/146 |
| 5,256,103 | 10/1993 | Abthoff et al. | 454/139 |
| 5,256,104 | 10/1993 | Arold | 454/158 |
| 5,259,813 | 11/1993 | Abthoff et al. | 454/75 |
| 5,273,487 | 12/1993 | Dauvergne | 454/139 |
| 5,302,153 | 4/1994 | Winters | 454/158 |
| 5,308,279 | 5/1994 | Grinberg | 454/139 |
| 5,312,467 | 5/1994 | Wolfe | 55/496 |
| 5,332,426 | 7/1994 | Tang et al. | 96/153 |
| 5,338,253 | 8/1994 | Damsohn et al. | 454/158 |
| 5,342,238 | 8/1994 | Segerpalm et al. | 454/136 |
| 5,350,443 | 9/1994 | von Blucher et al. | 96/135 |
| 5,350,444 | 9/1994 | Gould et al. | 96/154 |
| 5,350,620 | 9/1994 | Sundet et al. | 428/172 |
| 5,358,442 | 10/1994 | Ekinci | 454/158 |
| 5,360,463 | 11/1994 | Dietterle et al. | 55/422 |
| 5,364,458 | 11/1994 | Burnett et al. | 96/55 |
| 5,433,764 | 7/1995 | Matschke | 55/511 |
| 5,476,526 | 12/1995 | Attermeyer | 55/496 |
| 5,492,551 | 2/1996 | Wolfe | 55/496 |

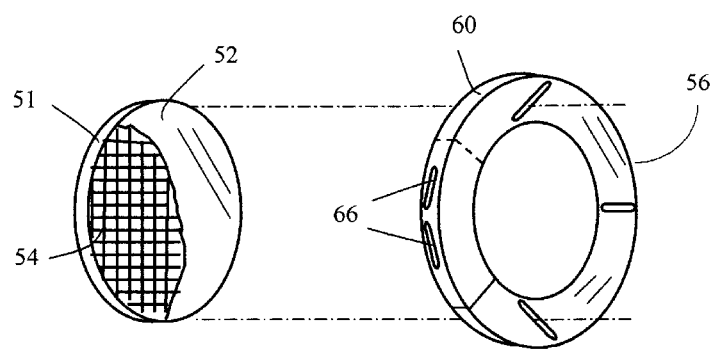
*Fig. 5*
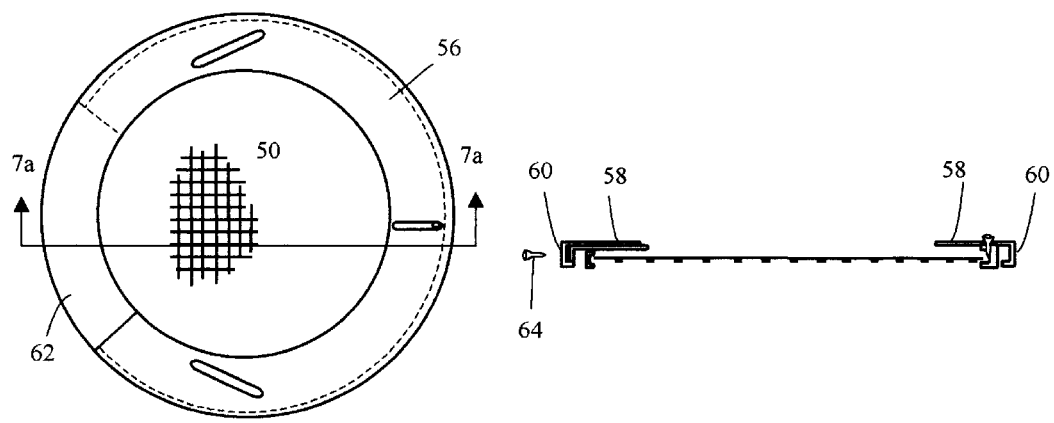
*Fig. 6a*   *Fig. 7a*
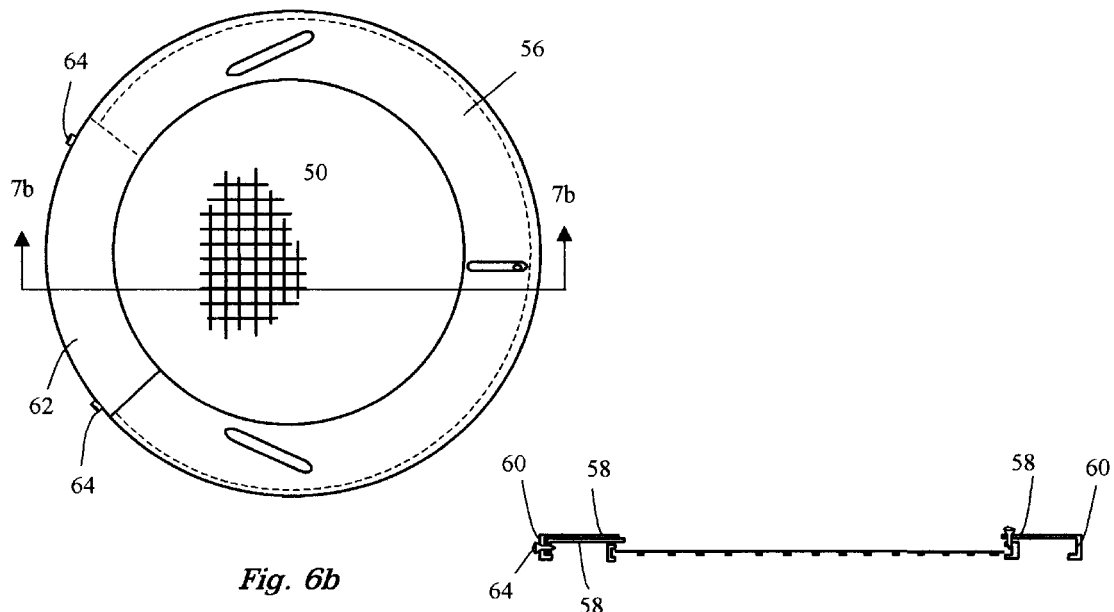
*Fig. 6b*   *Fig. 7b*

ADJUSTABLE FILTER ASSEMBLY

FIELD OF THE INVENTION

This invention relates to adjustable filter assemblies. Specifically, this invention relates to an adjustable assembly for adapting or retrofitting a variety of filter media, particularly planar media, to a variety of applications.

BACKGROUND OF THE INVENTION

There are a variety of applications that require filtering of different types. There are filters used in light projection to create images, colors and like effects. There are filters for gases, including air, to separate gases, remove particles, and similar uses. There are filters or screens used to cover openings to prevent entry of rodents and insects. All these different applications are similar in that they involve insertion of a filter medium in the path of travel of the matter, substance or energy to be filtered. For optimum filtration, all the matter, substance or energy travelling in a particular path should be obstructed from travelling around the filter medium, and thus directed through the filter medium. Presently, this is accomplished by custom fitting filter assemblies for particular applications. In Winters, U.S. Pat. No. 5,302,153, the inventor discloses a complicated assembly for fitting a customized dust filter to the intake cowl of a motor vehicle. Gould et al., U.S. Pat. No. 5,350,444 discloses a hydrocarbon filter that can be adapted to the air intake of passenger vehicles by cutting the specialized filter to size. Similarly, Nolan, U.S. Pat. No. 5,188,646, relates to an adjustable air filter for use in building heating, ventilating, and air conditioning systems comprising an adjustable frame and a trimmable medium. Problems with these systems is they are too complex, too costly and too difficult to install.

Although the present invention can be applied to an endless variety of filter applications, the automobile will provide an example of the practical problems with the filter systems provided by the current technology. Each of the cars on the road today were designed with a passenger compartment ventilation system that, until very recently, was not equipped with any type of filter. The configuration and accessibility of the various intake and recycle points in these vehicles is unique to the make, model and year of the vehicle. Thus, it is impractical to make a customized filter for each type of vehicle. In addition, the limited accessibility to many of these air intake points makes it impractical to expect a large number of car owners to proceed through the necessary cutting and trying steps to properly fit the filter frame and medium as provided by the technology heretofore.

An analogous problem is found in commercial and residential HVAC systems. The architectural design and building configurations often result in non-standard, modified, or unique air exchange vents for the HVAC systems.

The present invention has surprisingly reduced or substantially overcome one or more of the aforementioned problems.

Accordingly, it is an object of the present invention to provide an adjustable filter assembly for installation in a wide variety of filtration applications.

It is another object of the present invention to provide a filter assembly that is fully adjustable without requiring cutting tools to re-size the frame or medium prior to installation.

It is still another object of the present invention to provide a filter assembly that can be readily adjusted to a variety of sizes and shapes for direct application in various filter applications.

It is a further object of the present invention to provide a filter assembly that can take a variety of shapes and sizes so that any vent orientation may be adequately fitted and filtered.

It is still a further object of the present invention to provide an adjustable filter assembly that can be used in production lighting applications to readily adapt a desired filter medium to a variety of lighting applications.

It is yet another object of the present invention to provide an adjustable air filter assembly that can be readily fitted to a variety of passenger vehicle ventilation systems.

It is yet a further object of the present invention to provide an adjustable air filter assembly that can readily be retrofitted to a variety of passenger vehicle ventilation system that is capable of removing a minimum of 80% of the sub-micron particles in the air without unduly affecting the air flow through the system.

These and other objects of the present invention will become readily apparent from the following description.

SUMMARY OF THE INVENTION

The adjustable filter assembly of the present invention can be supplied with a wide variety of filter media and applied to a wide variety of filter applications. The assembly provides a continuously adjustable molding structure and a fixed sized filter medium secured and supported as necessary with a grid and frame. This fixed-size medium is applied to a broad range of sizes, for instance of an air vent, by simply extending the molding to the appropriate dimensions. The molding provides a means to readily attach and maintain the filter medium across the air vent and also serves to restrict/block substantially all air passage except that which passes through the exposed area of the air filter.

The molding comprises at least one adjustable joint enabling the molding to be continuously adjusted from an unextended position through to a fully extended position. In the unextended position, the outside edge of the molding coincides with the perimeter of the filter media and the inner edge of the molding defines a minimum exposed area for the filter medium. In the fully extended position, the inner edge of the molding coincides with the perimeter of the filter media (i.e. the maximum exposed area of the filter medium) and the outside edge of the molding extends outwardly significantly beyond the perimeter of the filter media. The variation in exposed area of the filter is directly related to the adjusted size of the molding. The farther the molding is extended the larger the exposed area of the filter medium.

BRIEF DESCRIPTION OF THE DRAWINGS

FIG. 5 is an exploded diagram of a circular filter assembly in accordance with the present invention.

FIG. 6A depicts a plan view of the filter assembly of FIG. 5, in an unextended position.

FIG. 6B depicts a plan view of the filter assembly of FIG. 5, in an extended position.

FIG. 7a is a sectional view along line 7a—7a of FIG. 6A.

FIG. 7b is a sectional view along line 7b 13 7b of FIG. 6B.

DETAILED DESCRIPTION OF THE INVENTION

Figure 1A:
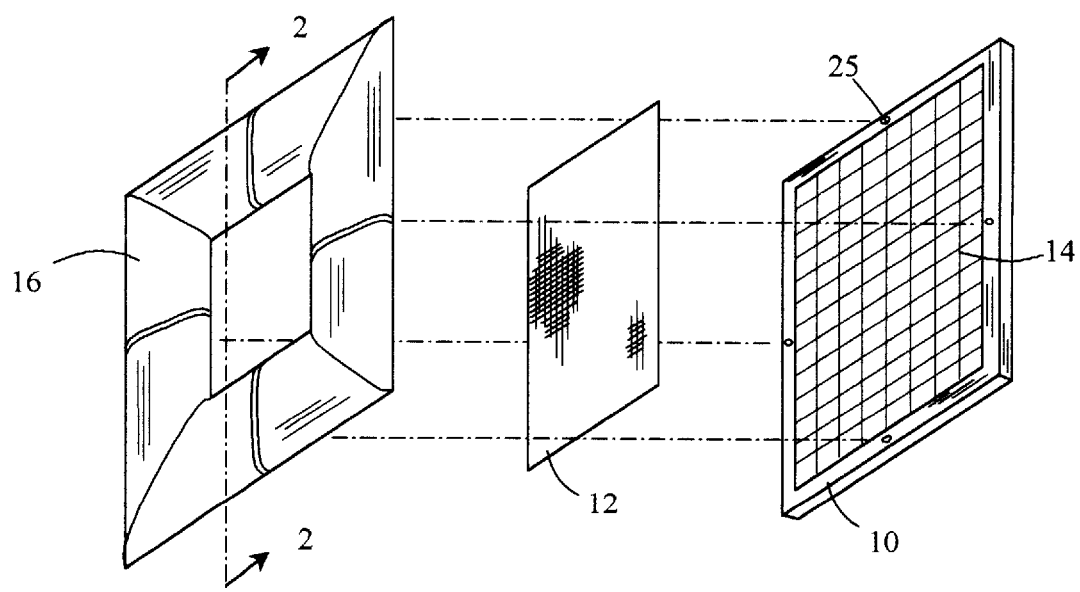
FIG. 1A depicts an exploded diagram of an unextended rectangular filter assembly in accordance with the present invention.

Before the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein are for the purpose of description and should not be regarded as limiting.

Figure 1B:
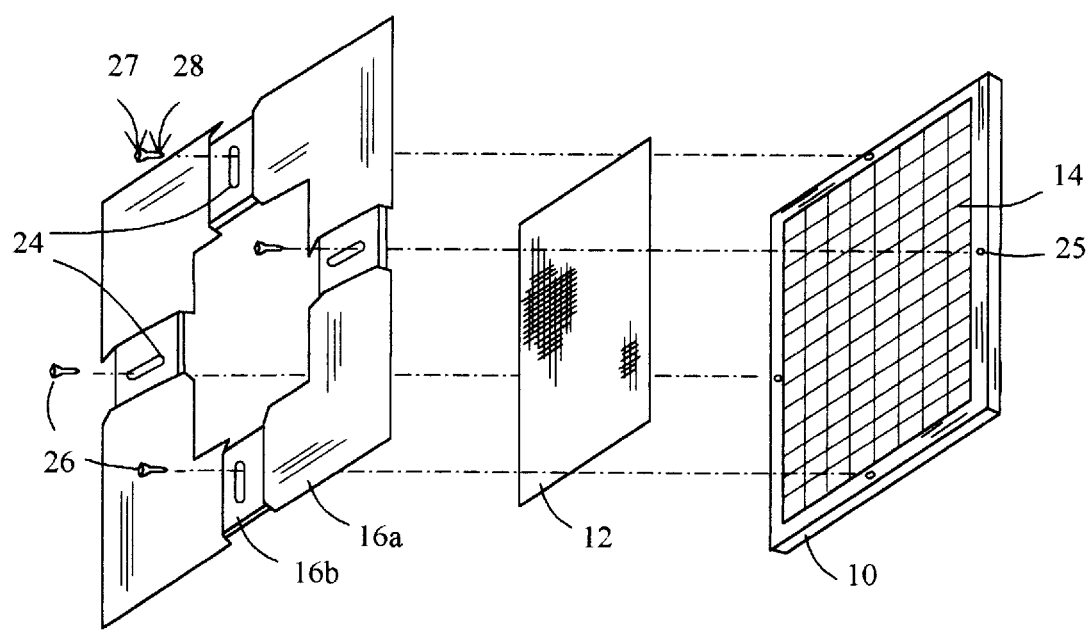
FIG. 1B depicts an exploded diagram of the rectangular air filter assembly of FIG. 1A in a partially extended position.
Figure 1C:
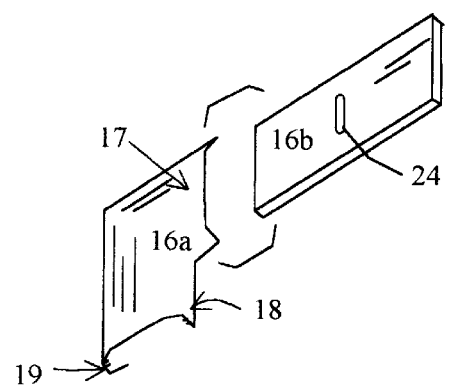
FIG. 1C depicts a perspective view of the two types of components used to form the rectangular filter assembly of the embodiments shown in FIGS. 1A & 1B.
Figure 2:
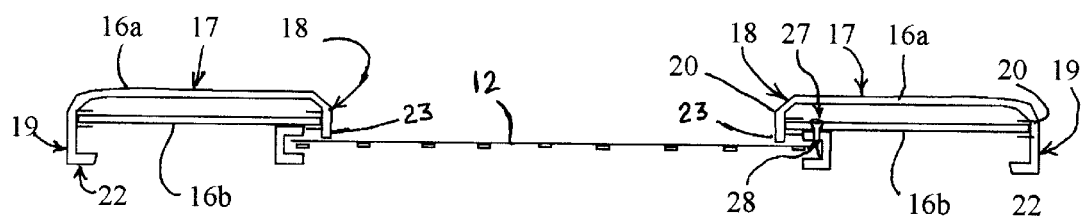
FIG. 2 is a sectional view along line 2—2 of FIG. 1A.

A first embodiment of the filter assembly of the present invention is generally depicted in FIGS. 1A & 1B. The assembly includes a filter medium 12 supported by a grid 14 both secured within a frame 10 that is attached to an adjustable molding 16. The molding is composed of a plurality of straight extension pieces 16b and corner pieces 16a, having two diverging legs, as shown in FIGS. 1B & 1C. The corner piece is essentially hollow with a substantially planar continuous face 17, an inside wall 18 and an outside wall 19, as shown in FIG. 2. The underside of the corner molding has a pair of opposing tracks 20 running along the inside of both the inside and outside walls from the end of each leg to essentially the corner. The outside wall 19 of the corner piece extends downwardly with a substantially perpendicular portion to form a flange 22. The inside wall extends beyond the interior track to form a stop 23.

The straight extension piece 16b is substantially uniform and designed to readily slide within the opposing tracks 20 on the interior of the corner pieces 16a. The extension piece is provided with a slot 24 extending perpendicular to the length of the extension piece and positioned at the center, as shown in FIG 1C. The frame 10 is connected to the molding 16 by a plurality of securing posts 26, which snap into pre-formed holes 25 in the frame 10. The attaching posts 26 include a head 27 which engages the upper surface of the extension piece 16b and a shaft 28 with an end for insertion through the slot 24 and the pre-formed hole 25 in the frame to retentively engage the frame 10. The head 27 is designed with a sufficiently low profile that the corner molding 16a can be readily slid over the slot 24 in the extension piece with the post inserted and the frame 10 attached, as shown in FIG. 2.

Although this embodiment depicts a grid 14, a grid is only necessary when the filter medium requires additional support to maintain its configuration. The grid, when required, may be positioned on either or both sides of the filter medium depending on the dynamics of the particular application. The grid may be any of several different forms, such as a series of unconnected support rods and may even be embedded into, or provided as a part of, the filter medium. Preferably, the frame 10 and grid 14 will be an integral structure consisting of molded plastic formed so that said grid is capable of supporting the medium against out-of-plane forces.

The frame 10 provides support and a means to secure the medium either to the molding and/or other surfaces as dictated by the configuration of the particular application. Any suitable frame may be used in this invention. Typically, the frame is designed to surround and attach to the peripheral outer edge of the filter medium 12. Preferably, the frame is constructed with an inwardly facing channel along its entire interior. This channel is designed to receive the outer peripheral portion of the medium. The medium may be secured within this channel by any conventional means.

The filter medium 12 will preferably be in a substantially planar configuration. The type of medium may be any type known for filtering gases, fluids, projected light, or the like. The filter media for light may include any type of medium suitable for this purpose such as ultraviolet light filters, filters for producing images and/or colors, and the like. The filter media for use in gas, specifically air, filtration applications may include individually, or in combinations, carbon filters, agglomerated, charged carbon filters, polymeric foam filters, natural fiber filters, woven and non-woven fiber filters, and the like. Preferably, the filter will comprise a medium capable of capturing at least 80% of the air-borne submicron particles without significantly restricting the air flow, such as the electrically-charged, polymeric non-woven fiber filters supplied by Minnesota, Mining, and Manufacturing of St. Paul, Minn. under the name Filtrete.

The molding 16 may be formed from any type of material suitable for this purpose including metal, wood, plastic, cardboard and/or combinations of these materials. Typically, the molding will be formed from injection molded plastic components. The pieces of the molding will typically have a surface that is solid to prevent passage of any light, air, water, creatures and the like.

Referring to FIG. 1B, the molding is composed of multiple parts. When the molding assumes a polygonal configuration it is typically composed of a plurality of corner pieces 16a and straight extension pieces 16b. Typically, the corner pieces will be designed with a substantially open bottom having an interior channel, in both legs, for slidably engaging the straight extension pieces. This channel should be designed to accommodate extension pieces that are just slightly narrower than the width of the corner pieces so that the width of the molding remains substantially uniform along each length as the molding is extended. The extension pieces are designed to slide within the channel in the corner pieces. The extension pieces will also be designed with a means to allow the frame to be attached to the extension piece. Preferably, this attachment point will be a slot 24 substantially perpendicular to the length of the extension piece positioned essentially in the center. This slot should be sized so that a pin, snap, screw or other similar device 26 can be inserted into the slot to engage and secure the frame while still allowing the secured frame to move laterally with respect to the molding.

The molding may be composed of a variety of different pieces including multiple corner pieces having a male end on one leg and a female end, capable of receiving a male end of a second corner piece, on the other leg. Therefore, a continuous molding structure could be formed by alternately inserting the male end of one corner piece into the female end of another corner piece. The corner pieces can be designed with different angles and lengths to achieve different configurations. The legs of the corner piece may be of different widths allowing greater extension of the molding in one direction. The molding structure may optionally include a plurality of articulating members which would enable the shape of the molding to be adjusted as well as the size. Preferably, the molding will be a rectangular configuration composed of four identical 90 degree corner pieces with four identical extension pieces of two different lengths.

The width of the molding will determine the overall adjustability that is achievable by a given assembly. For instance, an assembly may be designed to accommodate a rectangular air inlet or outlet vent ranging from 10×15 centimeters up to about 15×20 centimeters. In this instance, the assembly will be designed with about a 10×15 centimeters frame with a properly fitted piece of filter medium. The adjustable molding will be designed so that it will project a minimum of 2 to 5 millimeters beyond the frame in the unextended position. This extended portion of the molding will provide an area or surface for attaching the assembly. The width of the molding is preferably 2.5 centimeters, uniformly around the structure. This will allow the molding to be extended in both the width and the length dimensions by about five centimeters to accommodate a 15×20 centimeters air vent.

Figure 3:
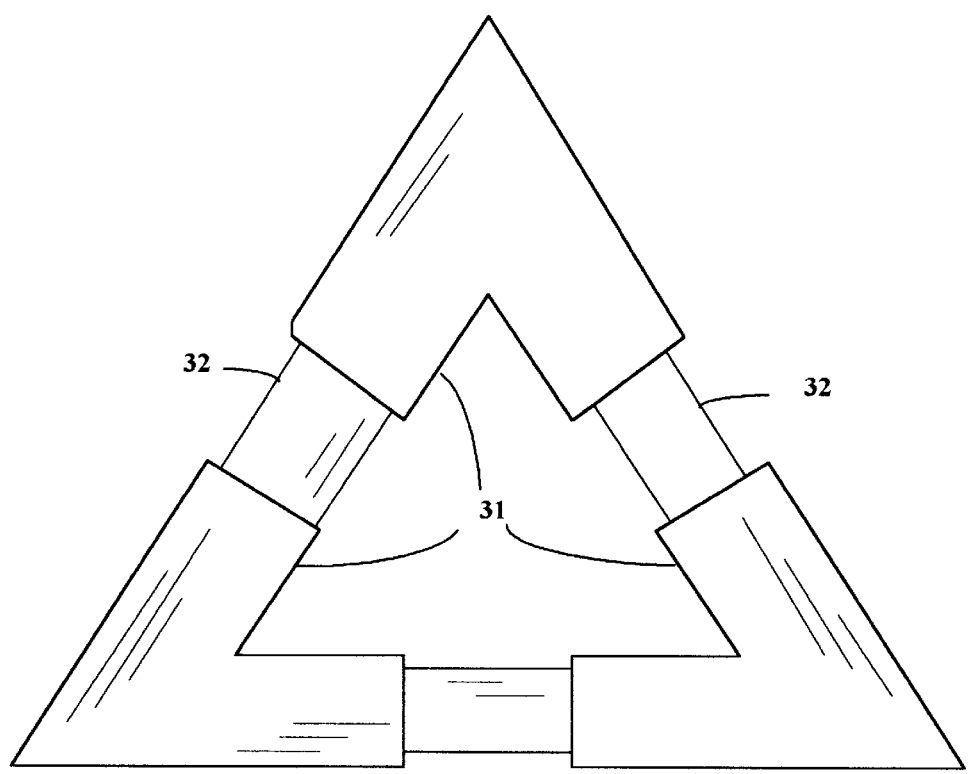
FIGS. 3 & 4 are plan views of two further embodiments in accordance with the present invention.
Figure 4:
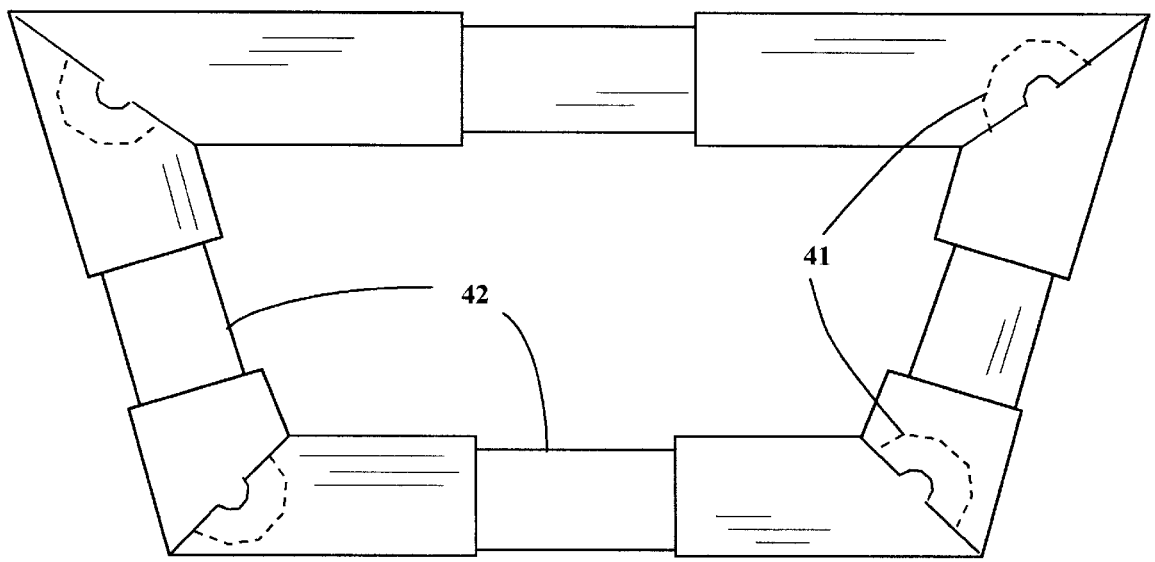

The assembly of the present invention can be used in an infinite number of configurations, depending on the shape and location of the particular types of openings or projection paths to be addressed. Additional polygonal embodiments of the invention are shown in FIGS. 3 and 4. These assemblies are essentially identical to the assembly shown in FIGS. 1–2 except for the shape of the molding and the associated frame, grid and medium. The filter assembly of FIG. 3 is designed for applications having triangular configurations. The assembly is composed of three corner pieces 31 and three extension pieces 32. The extension pieces fit telescopically within the corner pieces, as described above, to provide an adjustable triangular molding. Alternatively, the assembly may be designed with articulating members so the molding could be adjusted to form other triangular configurations including equilateral, right angle, left angle and any other configurations therebetween.

The trapezoidal configuration of FIG. 4 is composed of four articulating corner pieces 41 and four extension pieces 42. The articulation of the corner pieces may be formed from any conventional means for providing articulation in devices of this type including flat hinges, slip joints, flex joints and the like. The articulating corners combined with the telescopically adjustable length provide a molding that is adaptable to a wide variety of shapes and sizes.

Another embodiment of the invention is shown in FIGS. 5–7, wherein the filter assembly 50 is circular. The assembly includes a filter medium 52, a frame 51, a grid 54, and a molding 56 having a planar top surface 58 and a substantially perpendicular outside wall 60. The molding is preferably composed of a single piece of flexible material formed or cut into a circular configuration having two ends that are overlapped to form a continuous structure having a telescoping joint 62. The length of the overlap may be about 2Π is at least The alignment of the overlapped ends is maintained by the outside wall of the overlapped end, which prevents outward separation, and a plurality of retainers 64, which prevent inward separation. The retainers may be any device capable of preventing inward separation of the two ends while enabling the ends to slide circumferentially with respect to each other. Preferably, the ends will be retained with a plurality of plastic snaps 64 inserted within a plurality of slots and/or holes 66 in the side walls of the overlapping ends, as best seen in FIG. 5.

Alternatively, the molding may be formed from two separate pieces: a face, formed from a relatively flexible material, and a sidewall, formed from a relatively rigid material. The two pieces are attached perpendicularly to each other by any suitable means. The more rigid sidewall provides both mechanical integrity to the assembly and a means for attaching the assembly, particularly, to a protruding pipe or tube.

In the circular embodiment of the present invention, the assembly of the molding in the unextended position, see FIG. 7A, projects just beyond the frame. The frame is attached to the molding in essentially that same fashion as described above except that there are no attachment points in the overlapping end portion of the molding, as shown in FIGS. 6A & 6B. There are a plurality of slots in the face of the molding for allowing the frame to slide inwardly from the perimeter, see FIGS. 6A & 7A, of the molding toward the interior edge of the molding, see FIGS. 6B & 7B, as the molding is extended. Typically, the telescopic joint 62 in the molding will allow the molding to be extended until the frame reaches the interior edge of the molding which represents the fully extended position. In this situation, the range of adjustability of the assembly is limited solely by the width of the molding.

The assemblies of the present invention may be attached by any suitable means dependent on the particulars of the application. A typically attachment means may include double-sided adhesive tape, elastic bands, wire ties, hook & loop fasteners, magnetic strips, twine, clips and the like. For application having a planar surface around the application area, the preferred attachment means is uses double-sided tape along the length of the mounting flange, as shown in FIG. 2. This will adequately secure the assembly and provide an additional seal against unfiltered passage. For protruding applications, that is applications where the area for applying the filter has only a thin edge defining the area, the assembly will have to be attached to a surface substantially perpendicular to the filter area. In these applications, the assembly may be secured by an exterior flange securely tightened to the exterior of the protruding element or by an elasticized sock having an end that can be secured about the protruding element and connected by a flexible continuous sleeve of material up to an opposite end that can secure the molding.

The use of the air filtering assembly of the present invention is substantially the same for all embodiments. Therefore, the application of the assembly shown in FIGS. 1–2 to a passenger vehicle air intake vent will be described with the understanding that all other embodiments are applied in a similar fashion.

In this exemplary application, the filter assembly of the present invention will comprise an adjustable rectangular molding having an attached frame and grid, if necessary, with a particular air filter medium secured thereto. First, the user will need to locate the air recycle intake vent on the vehicle. Second, the filter assembly is adjusted by holding the molding on opposite sides and pulling in opposite directions, thereby enlarging the molding to the desired dimension. This step is repeated for the other dimension. Third, double-sided adhesive tape is applied along the mounting flange of the molding. Fourth, the filter assembly is aligned in front of the air intake vent and pressed against the surface causing the adhesive tape to adhere to the surface about the vent.

To initiate operation, the user turns on the fan switch of the vehicle ventilation system and positions the control lever in the "recycle" mode (sometimes referred to as "maximum" mode). When the blower fan of the ventilation system is operating, air is drawn by the fan through the air filter tending to pull the filter and assembly toward the vent. Filtration may occur for a finite time to remove particles and nuisance odors which enter the vehicle from exterior sources, or continuously, to remove smoke particles and other particles emitted from chronic internal sources such as upholstery and clothing. The filtration may not remove 100% of contaminants but should reduce the particle and odor levels below any nuisance or allergen threshold.

The filtering assembly of the present invention can be utilized for motor vehicle air inlet and outlet points of varying shapes, sizes and types. The adjustability of the assembly allows for one assembly to fit a range of shapes and sizes. The assemblies of the present invention may take many forms and be attached in a variety of configurations.

The filter assembly of the present invention can be supplied with light filters, fluid filters, and/or gas filters and applied in a variety of applications from use in projected light systems including overhead projectors and studio lights. The adjustable assembly of the present invention may also be useful with a screen in both commercial and residential applications to prevent the ingress of rodents and/or insects.

What is claimed is:

1. An adjustable filter assembly comprising:
   a filter medium having a peripheral edge wherein said filter medium has a pre-defined size;
   a frame encircling said peripheral edge, said frame having an inner edge and an outer edge;
   an adjustable molding capable of being extended in at least one dimension wherein said adjustable molding is a continuous structure comprising:
     a plurality of straight pieces; and
     a plurality of corner pieces having two diverging legs wherein said straight and said corner pieces are alternately connected to form a continuous structure, each of said legs comprises a flat face; an inner wall; and an outer wall;
   a flange connected to said outer wall and disposed in substantially perpendicular relation to said outer wall; and
   a connecting means for attaching said adjustable molding to said frame;
   wherein at least one of said legs of said corner pieces has a tracking means for telescopingly engaging and retaining said straight pieces;
   wherein said outer wall is coincident with or extends outwardly beyond said outer edge of said frame when said molding is in an unextended position and said inner wall is inward of said inner edge of said frame, whereby at least a portion of said molding overlaps said frame, and said outer wall extends outward beyond said outer edge of said frame when said molding is in an extended position.

2. The assembly of claim 1 wherein said connecting means comprises at least one slot in said straight piece of said adjustable molding, at least one hole in said frame, and at least one post for insertion through said slot and said hole to retentively engage said frame wherein said adjustable molding is slidably attached to said frame.

3. The assembly of claim 1 wherein said molding additionally comprises at least one stop for retaining said frame within said inner wall and said outer wall of said corner piece, said stop comprising a portion of said inner wall.

4. The assembly of claim 1 wherein said filter medium is substantially planar and said molding is substantially planar.

5. The assembly of claim 1 wherein said flat face of said molding is a substantially continuous surface joining said inner wall and said outer wall.

6. The assembly of claim 1 wherein said molding is a substantially continuous polygonal shaped structure.

7. The assembly of claim 1 wherein said molding has a plurality of articulated joints, said joints being a part of said corner pieces and said joints connecting said legs of said corner pieces.

8. The assembly of claim 1 wherein said frame additionally comprises at least one structural element for supporting said medium.

9. The assembly of claim 1 wherein said filter medium is capable of passing a first substance and not passing a second substance.

10. The assembly of claim 1 wherein said filter medium is an air filter.

11. The assembly of claim 1 wherein said filter medium is a fluid filter.

12. The assembly of claim 1 wherein said filter medium is a light filter.

13. An adjustable filter assembly comprising:
   a filter medium having a peripheral edge wherein said filter medium has a pre-defined size;
   a frame encircling said peripheral edge, said frame having an inner edge and an outer edge;
   an adjustable molding capable of being extended in at least one dimension wherein said molding is a continuous structure comprising a plurality of corner pieces having two diverging legs, one of said legs having a male end and the other of said legs having a female end comprising a flat face; an inner wall; and an outer wall; and
   a connecting means for attaching said adjustable molding to said frame;
   a flange connected to said outer wall of at least one corner piece and disposed in substantially perpendicular relation to said outer wall;
   wherein said female end of said molding has a tracking means for telescopingly engaging and retaining said male end wherein said corner pieces are serially connected to form a continuous structure;
   wherein said outer wall is coincident with or extends outwardly beyond said outer edge of said frame when said molding is in an unextended position and said inner wall is inward of said inner edge of said frame, whereby at least a portion of said molding overlaps said frame, and said outer edge extends outward beyond said outer edge of said frame when said molding is in an extended position.

14. The assembly of claim 13 wherein said frame additionally comprises at least one structural element for supporting said medium.

15. The assembly of claim 13 wherein said filter medium is capable of passing a first substance and not passing a second substance.

16. An adjustable filter assembly comprising:
   a circular filter medium having a peripheral edge wherein said medium has a pre-defined size;
   a frame encircling said peripheral edge, said frame having an inner and an outer edge;
   an adjustable continuous molding substantially formed from a single piece of material comprising an inner edge which defines the exposed area of said filter medium; an outer wall which defines the perimeter; and at least one telescoping joint; and a flange connected to said outer wall and disposed in substantially perpendicular relation to said outer wall; and
   a connecting means for attaching said adjustable molding to said frame;
   wherein said outer wall of said adjustable molding coincides with said outer edge of said frame when said adjustable molding is in an unextended position and said inner edge of said adjustable molding coincides with said inner edge of said frame when said adjustable molding is in an extended position.

17. The assembly of claim 16 wherein said connecting means comprises at least one slot in said molding, one hole in said frame, and one post for insertion through said slot and said hole wherein said molding is slidably affixed to said frame.

18. The assembly of claim 16 wherein said telescoping joint is formed by overlapping a first end of said molding with a second end of said molding and comprises retainer means for maintaining the alignment of said overlapping ends.

19. The assembly of claim 16 wherein said frame additionally comprises at least one structural element for supporting said medium.

20. The assembly of claim 16 wherein said filter medium is capable of passing a first substance and not passing a second substance.

\* \* \* \* \*